United States Patent
Papolu et al.

(10) Patent No.: US 11,556,226 B2
(45) Date of Patent: *Jan. 17, 2023

(54) USER INTERFACE FOR TAG MANAGEMENT

(71) Applicant: INTUIT INC., Mountain View, CA (US)

(72) Inventors: Smitha Prasad Papolu, Sunnyvale, CA (US); Natalie Harmon, Sunnyvale, CA (US)

(73) Assignee: INTUIT, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/655,824

(22) Filed: Mar. 22, 2022

(65) Prior Publication Data

US 2022/0214781 A1    Jul. 7, 2022

Related U.S. Application Data

(63) Continuation of application No. 16/730,581, filed on Dec. 30, 2019, now Pat. No. 11,314,380.

(51) Int. Cl.
*G06F 3/048* (2013.01)
*G06F 3/0482* (2013.01)
*G06F 3/04847* (2022.01)
*G06Q 40/00* (2012.01)

(52) U.S. Cl.
CPC ........ *G06F 3/0482* (2013.01); *G06F 3/04847* (2013.01); *G06Q 40/123* (2013.12)

(58) Field of Classification Search
CPC .. G06F 3/0482; G06F 3/04847; G06Q 40/123
See application file for complete search history.

(56) References Cited

U.S. PATENT DOCUMENTS

| | | | |
|---|---|---|---|
| 2008/0278438 | A1 | 11/2008 | Brown et al. |
| 2008/0282198 | A1 | 11/2008 | Brooks et al. |
| 2008/0306921 | A1 | 12/2008 | Rothmuller et al. |
| 2010/0083173 | A1 | 4/2010 | Germann et al. |
| 2012/0324002 | A1 | 12/2012 | Chen |

(Continued)

OTHER PUBLICATIONS

International Search Report/Written Opinion issued to PCT/US2020/033931 dated Sep. 28, 2020.

(Continued)

*Primary Examiner* — Aleksey Olshannikov
(74) *Attorney, Agent, or Firm* — Patterson & Sheridan, LLP

(57) ABSTRACT

Aspects of the present disclosure provide techniques for providing a graphical user interface. Embodiments include displaying a text input field. Embodiments include receiving an input of at least a portion of a tag via the text input field. Embodiments include displaying, in response to the input and proximate to the text input field, a graphical representation of an existing tag that relates to the input. The graphical representation includes a type of the existing tag, the existing tag, and a colored section on a right side or a left side of the graphical representation having a color that is associated with the type of the existing tag in the computing application. Embodiments include receiving a selection of the graphical representation and displaying an instance of the graphical representation inside of the text input field.

20 Claims, 14 Drawing Sheets

(56) References Cited

U.S. PATENT DOCUMENTS

| | | |
|---|---|---|
| 2014/0122498 A1 | 5/2014 | Mok et al. |
| 2014/0359505 A1 | 12/2014 | Cisler et al. |
| 2015/0106746 A1 | 4/2015 | Vojak |
| 2015/0186825 A1 | 7/2015 | Balasubramhanya et al. |
| 2016/0378718 A1 | 12/2016 | Jarroush |
| 2018/0373415 A1 | 12/2018 | Dellinger et al. |
| 2020/0364294 A1 | 11/2020 | Brown et al. |

OTHER PUBLICATIONS

TagSpaces (https://labored-umbrella.aerobaticapp.com/b372_b5c22a0f-4d6b-45a9-991a-8429a5c1a7a0/assets/files/tagspaces-manual-v2-9f6e63123357257f508aac550e01468e.pdf, full documentation attached as pdf, Apr. 27, 2017). (Year: 2017).

USER INTERFACE FOR TAG MANAGEMENT

CROSS-REFERENCE TO RELATED APPLICATIONS

This application is a continuation of co-pending U.S. patent application Ser. No. 16/730,581, filed Dec. 30, 2019, the entire contents of which are incorporated herein by reference.

INTRODUCTION

Aspects of the present disclosure relate to a user interface for management of tags, such as for classification of data in a computing application.

BACKGROUND

Software applications often involve management of large amounts of data. In an example, a financial services application may be used to manage large numbers of transaction records, such as for accounting or tax preparation purposes.

Data management can become increasingly difficult as amounts of data maintained by an application increase. Some applications allow data items to be grouped into categories, but categorizing data can be a time-consuming task, particularly with large data sets. Furthermore, as applications are increasingly accessed from mobile devices, reviewing and assigning categories to large amounts of data can be particularly inefficient with the limited screen space available on such devices.

Accordingly, there is a need in the art for improved user interfaces for data categorization.

BRIEF SUMMARY

Certain embodiments provide a method for providing a graphical user interface for a computing application. The method generally includes: displaying a text input field; receiving an input of at least a portion of a tag via the text input field; and displaying, in response to the input and proximate to the text input field, a graphical representation of an existing tag that relates to the input, wherein the graphical representation comprises: a type of the existing tag; the existing tag; and a colored section on a right side or a left side of the graphical representation having a color that is associated with the type of the existing tag in the computing application; receiving a selection of the graphical representation; and displaying an instance of the graphical representation inside of the text input field.

Other embodiments provide a method for providing a graphical user interface for a computing application. The method generally includes: displaying a plurality of graphical representations of tag types, wherein each respective graphical representation of the plurality of graphical representations of tag types comprises: text of a respective tag type; and a colored portion having a respective color that is associated with the respective tag type in the computing application; receiving a selection of a given graphical representation of the plurality of graphical representations of tag types; displaying, in response to the selection, one or more additional graphical representations of tags that correspond to a given tag type represented by the given graphical representation, wherein each additional graphical representation of the one or more additional graphical representations of tags comprises: the given tag type; a given tag; and a colored section on a right side or a left side of the additional graphical representation having a given color that is associated with the given tag type in the computing application.

Other embodiments provide a system, comprising: one or more processors; and a non-transitory computer readable medium comprising instructions that, when executed by the one or more processors, cause the system to perform a method for providing a graphical user interface for a computing application. The method generally includes: displaying a text input field; receiving an input of a tag via the text input field; receiving an indication of a type of the tag; generating a graphical representation of the tag, wherein the graphical representation of the tag comprises: the type of the tag; the tag; and a colored section on a right side or a left side of the graphical representation of the tag having a color that is associated with the type of the tag in the computing application; and displaying an instance of the graphical representation of the tag inside of the text input field.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for providing a user interface for tag management.

A software application may allow users to assign tags to data items for categorization purposes. In some embodiments, tags may also be grouped into types for more efficient data management. For example, a financial services application may allow a user to assign tags to transactions and to group tags into types. In one example a tag of "catering" is assigned to a transaction, and the tag "catering" is assigned the type of "events". As such, the tag indicates that the transaction relates to catering for an event. Tag such as "events: catering," "events: entertainment," and "transportation: airfare" can then be used to easily identify the purposes of transactions for financial management tasks, such as accounting or tax preparation, with the application.

Techniques described herein provide efficient and user-friendly interfaces for managing tags, such as searching for existing tags and types and creating new tags and types for data categorization, in which types are associated with colors.

Example User Interface for Tag Management

Figure 1:
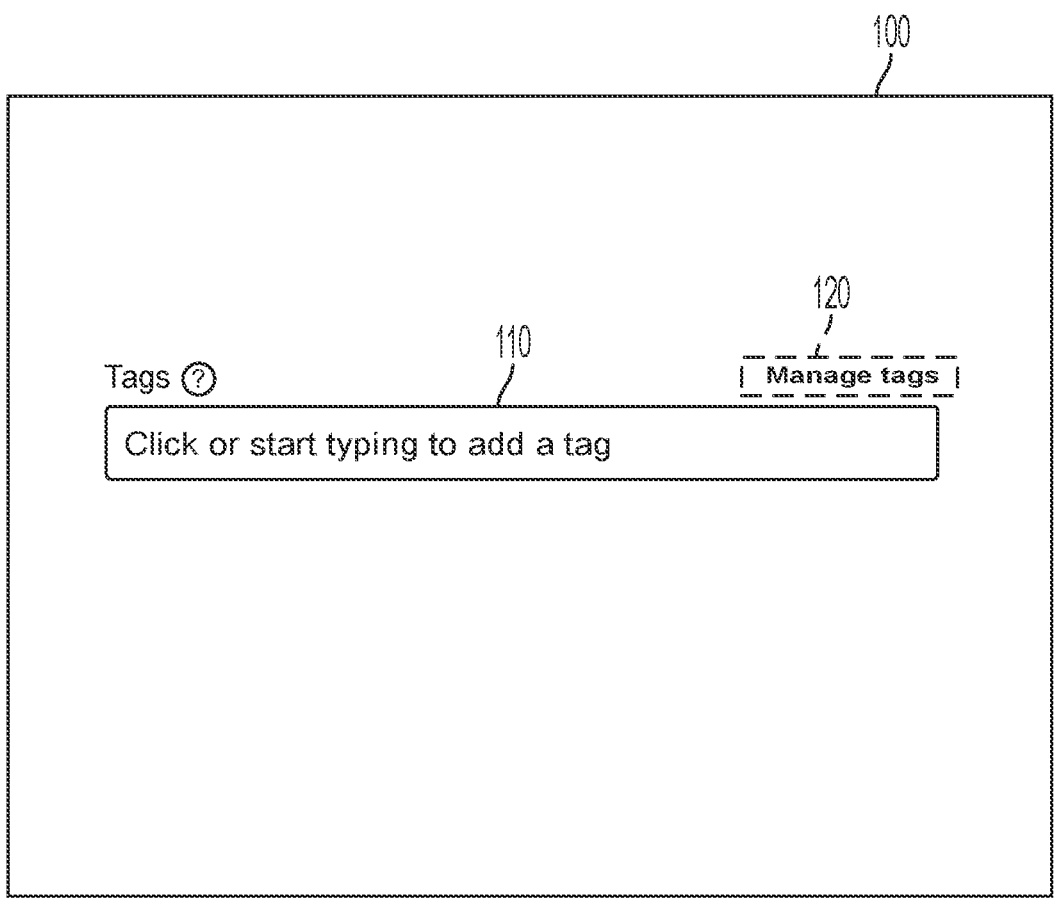
FIG. 1 depicts an example screen of a graphical user interface for tag management.

FIG. 1 illustrates an example screen 100 of a user interface for tag management within a computing application. In an example, screen 100 is displayed in response to user input requesting to add tags to one or more data items, such as transactions.

Screen 100 includes a text input field 110 which allows a user to provide text input for adding a tag to a data item. Text input field 110 can be used to either search for an existing tag, as described below with respect to FIGS. 2-4, or to create a new tag of a new or existing type, as described below with respect to FIGS. 5-9. Screen 100 also includes a link 120 to "manage tags", which launches a tag management screen as described below with respect to FIG. 10.

Figure 2:
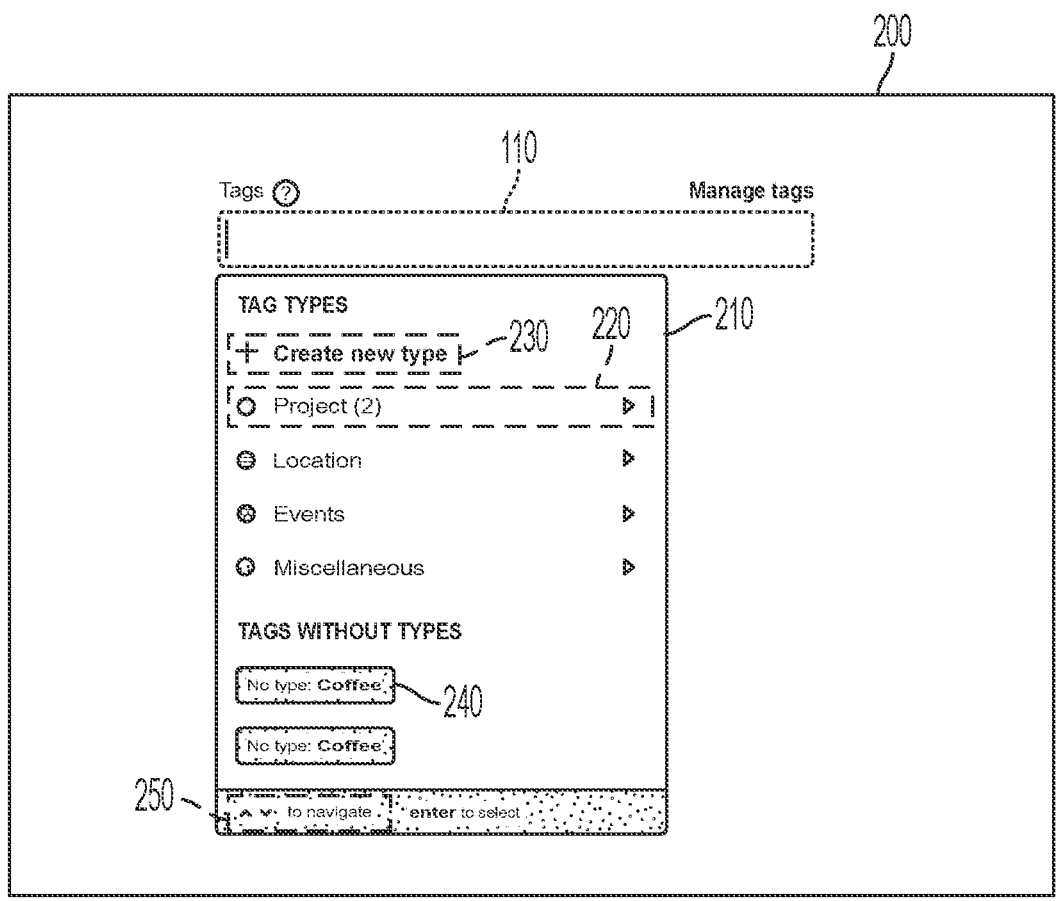
FIG. 2 depicts another example screen of a graphical user interface for tag management.

FIG. 2 illustrated another example screen 200 of the user interface for tag management. In this example, screen 200 is displayed after a user clicks on text input field 110 of FIG. 1 and before any text is entered. Screen 200 includes text input field 110 of FIG. 1, as well as menu 210.

Menu 210 includes a plurality of graphical representations of tag types, including representation 220 of the type "project". Representation 220 includes a colored symbol (a circle in this example) adjacent to the text type (on the left side in this example). In this example, the color of the colored symbol is associated with the type "project". For instance, a user may have assigned the color to the type "project" when creating the type, as described below with respect to FIG. 9. The color allows tags of the type "project" to be visually identified more easily.

Representation 220 further includes a count element (parenthetical number in this example) indicating how many tags belong to the type "project". In this case, there are two tags of the type "project" accessible via representation 220. Clicking on representation 220 may cause screen 500 of FIG. 5 to be displayed, in which a user can locate an existing tag of the type "project" or add a new tag to the type "project".

Menu 210 also includes a link element 230 that allows a user to create a new type. Link element 230, when selected, may cause screen 900 of FIG. 9 to be displayed Menu 210 also lists tags without types, which may be referred to as "flat tags". For example, menu 210 includes representation 240 of a flat tag for "coffee" that is not associated with a type. A tag may have no type because a user has not assigned a type to the tag, such as because the tag is not easily categorized into a type.

A user may use an up arrow and down arrow on a keyboard, the up and down navigation elements 250 within menu 210, a swipe gesture on a touch screen, a mouse, or another input device to navigate through the options displayed in screen 200 and/or to scroll farther down to additional content (not shown). The user may press "enter", click, touch, or provide another type of input to select a given option.

Figure 3:
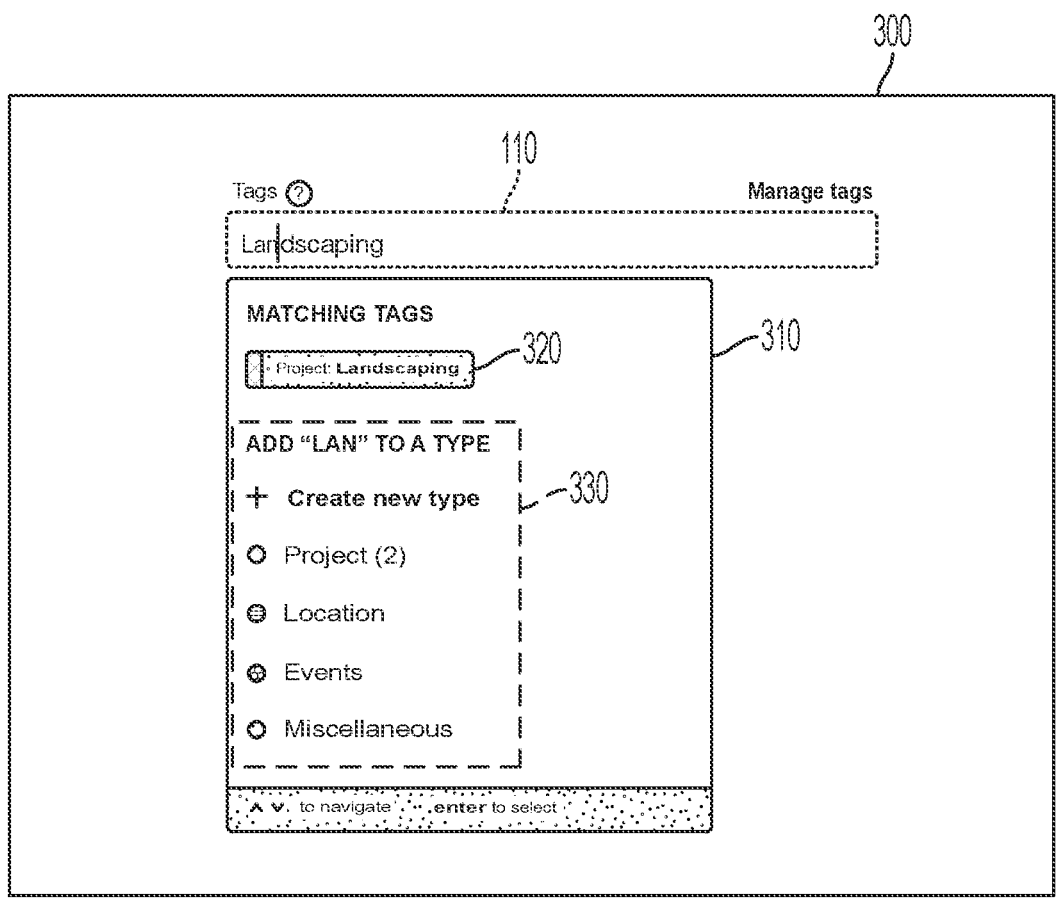
FIG. 3 depicts another example screen of a graphical user interface for tag management.

FIG. 3 illustrates another example screen 300 of the user interface for tag management. In an example, screen 300 is displayed after a user begins to enter text into text input field 110 of FIGS. 1 and 2.

Screen 300 includes text input field 110 of FIG. 1, in which a user has begun to enter text. In this case, the user has typed "lan". The user may either be searching for an existing tag or typing the name of a new tag that the user intends to create. A suggestion is shown within text input field 110 for the word "landscaping," as there is an existing tag (as depicted in representation 320) with this name.

Menu 310 lists matching tags for the text entered in text input field 110 ("lan"), including a representation 320 of the tag "landscaping" of the type "project". Representation 320 includes the type and tag, separated by a delimiter (in this case, a colon), and a colored portion that has a color that is associated with the type. In this case, the type "project" is associated with a shade of blue, and so the colored portion of representation 320 is the shade of blue. The colored portion generally begins at an edge of representation 320 and extends a predefined distance in a direction, such as laterally in this example. It is noted that the colored portion of a representation may alternatively be on the opposite side of the representation (e.g., the right side rather than the left side as shown in screen 300). Selecting representation 320 may cause screen 400 of FIG. 4 to be displayed, in which the tag "project: landscaping" is added to the list of tags selected by the user for a data item.

Menu 310 also includes a user interface element 220 (e.g., an overlaid or pop-up window) for creating a new tag "lan", and adding the new tag to an existing type (project, location, events, or miscellaneous) or creating a new type for the new tag.

Figure 4:
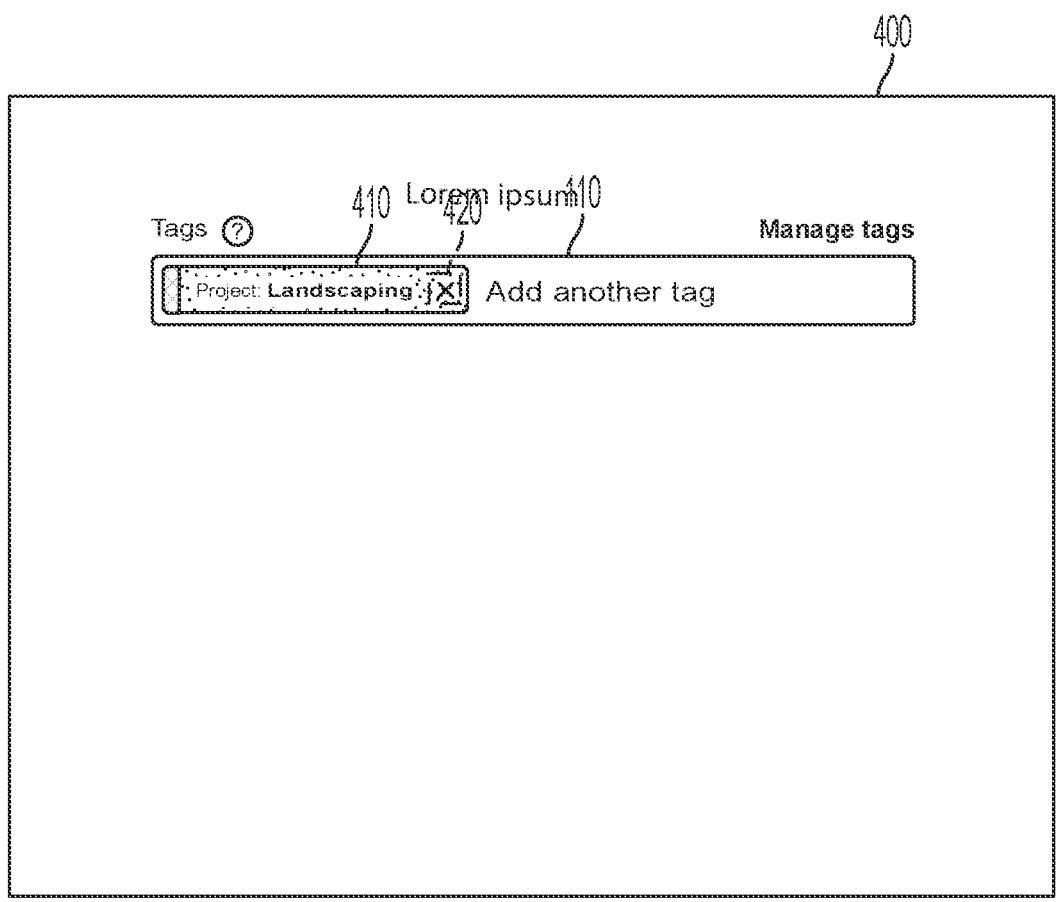
FIG. 4 depicts another example screen of a graphical user interface for tag management.

FIG. 4 illustrates another example screen 400 of the user interface for tag management. In an example, screen 400 is displayed after a user selects representation 320 of FIG. 3 to add the tag "project: landscaping" to the list of tags for a data item. As described below, screen 400 may also be displayed after a user selects representation 520 of screen 500 of FIG. 5.

Screen 400 includes representation 410 of the tag "project: landscaping" within text input field 110, indicating that the tag "project: landscaping" has been selected by the user for assignment to a data item. Representation 410 includes a user interface element 420 that allows the tag "project: landscaping" to be removed from the list of selected tags. Selecting user interface element 410 may cause screen 100 of FIG. 1 to be displayed.

In screen 400, data input field 110 allows additional tags to be searched for or created. For example, if a user clicks on the region of text input field 110 next to representation 410, the user is able to enter text to search for or create an additional tag.

Figure 5:
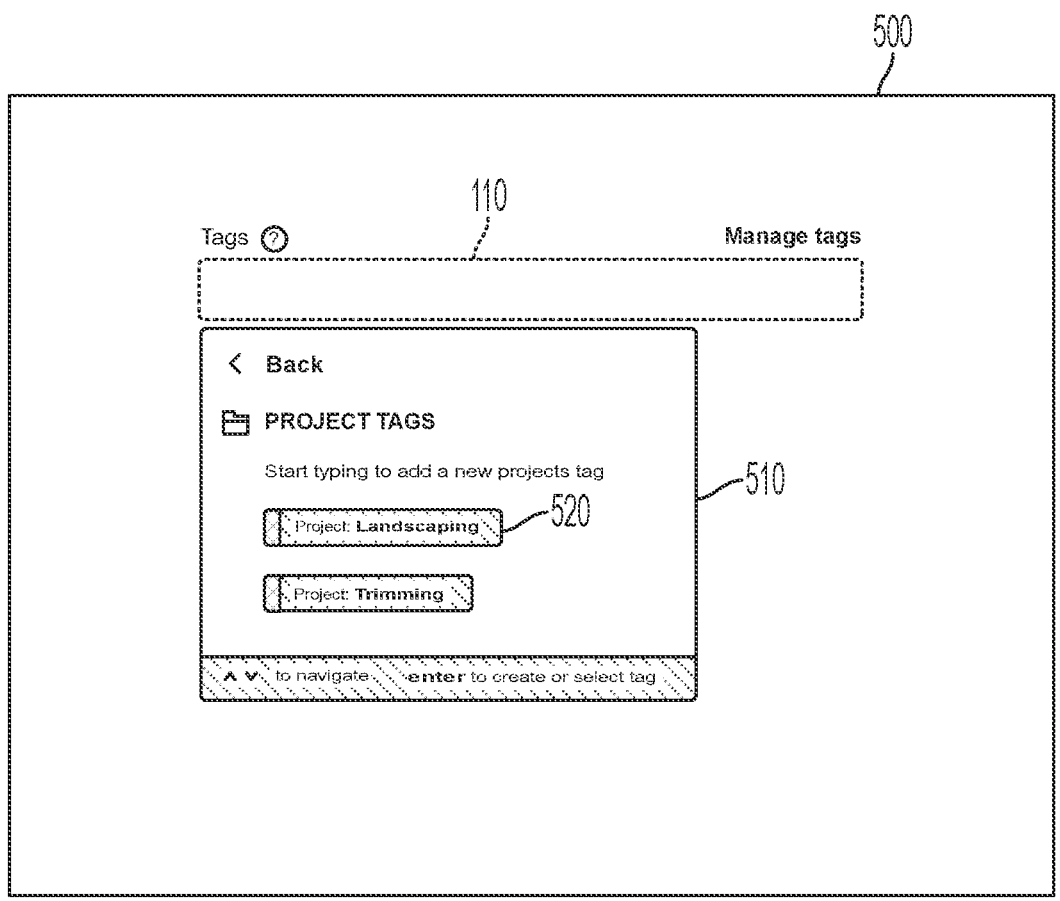
FIG. 5 depicts another example screen of a graphical user interface for tag management.

FIG. 5 illustrates another example screen 500 of the user interface for tag management. In an example, screen 500 is displayed after a user selects representation 220 of FIG. 2 to locate tags of the type "project" or to add a new tag to the type "project". The user may enter text into text input field 110 in order to search for or a tag within the type "project"

or create a new tag within the type "project" (as described below with respect to FIG. 6), and/or may select one of the tags listed in menu 510.

Screen 500 includes menu 510, which lists all tags of the type "project". Menu 510 lists, for example, representation 520 of the tag "project: landscaping". Selecting representation 520 may cause screen 400 of FIG. 4 to be displayed, indicating that the tag "project: landscaping" has been selected by the user for assignment to a data item.

Figure 6:
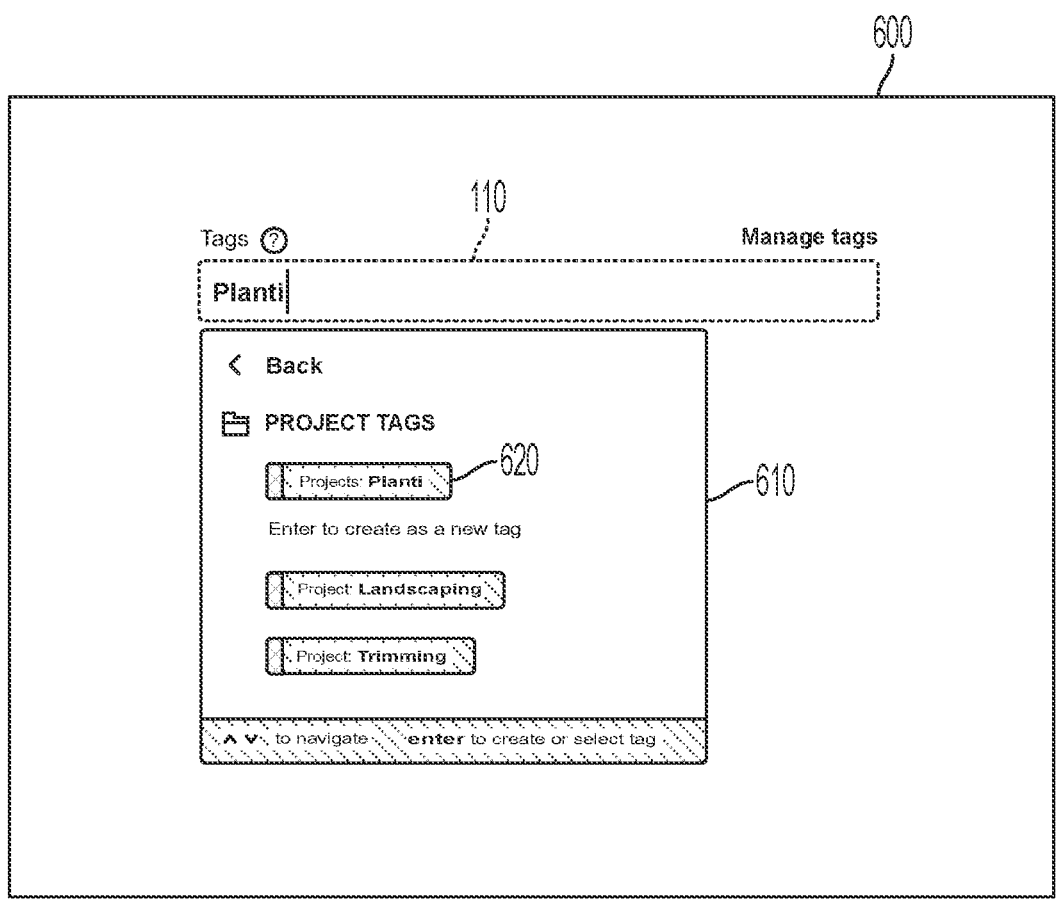
FIG. 6 depicts another example screen of a graphical user interface for tag management.

FIG. 6 illustrates another example screen 600 of the user interface for tag management. In an example, screen 600 is displayed after a user begins to enter text into text input field 110 of screen 500 of FIG. 5, either to search for a tag within the type "project" or to create a new tag within the type "project".

In this case, the user has entered the text "planti", which does not match any existing tags of the type "project" (e.g., "landscaping" or "trimming"). As such, menu 610 includes representation 620, which is a proposed representation of a new tag "planti" within the type "project". Selecting representation 620 would cause the tag "projects: planti" to be created and added to the list of tags selected by the user for assignment to a data item. In this case, the user may continue typing to complete the word "planting", and representation 620 may dynamically change to include the full text ("planting") entered by the user.

Figure 7:
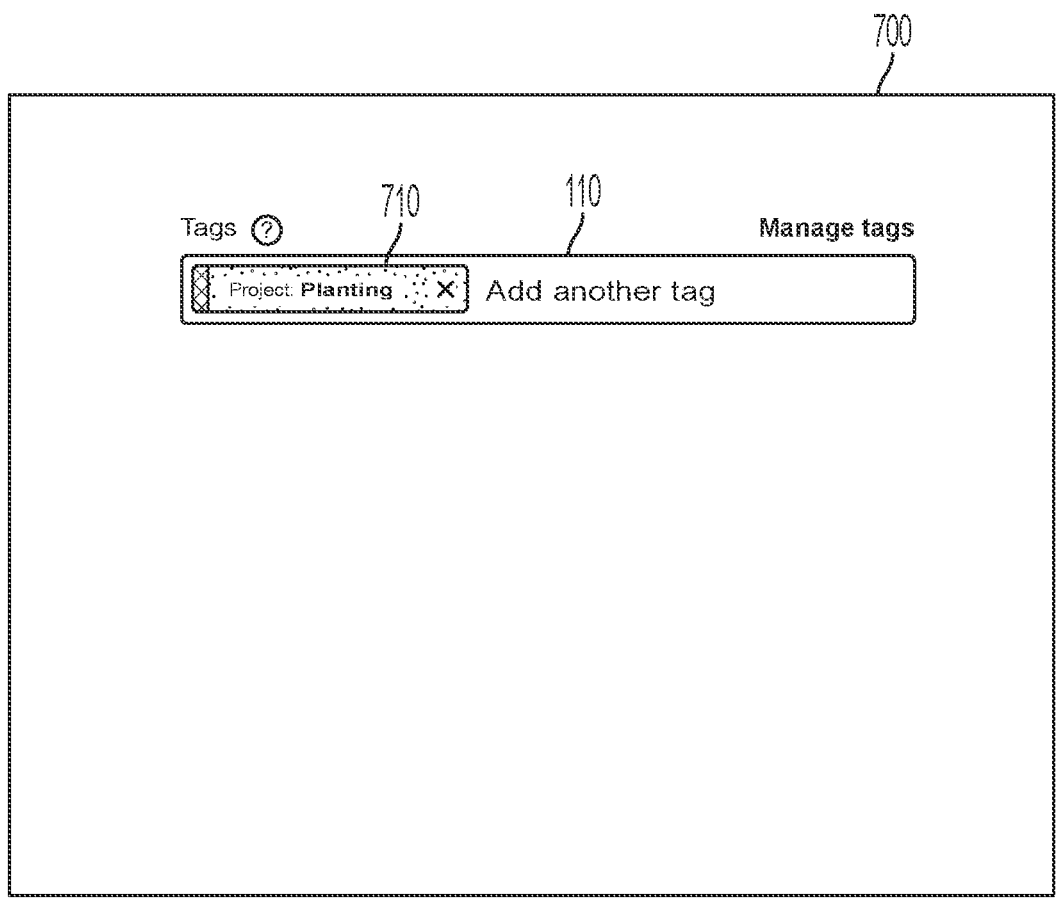
FIG. 7 depicts another example screen of a graphical user interface for tag management.

FIG. 7 illustrates another example screen 700 of the user interface for tag management. In an example, screen 700 is displayed after a user types "planting" into text input field 110 of screen 600 of FIG. 6, and selects a version of representation 620 that includes the full text "planting" in order to create a new tag "project: planting".

Screen 700 includes representation 710 of the tag "project: planting" within text input field 110, indicating that the tag "project: planting" has been selected by the user for assignment to a data item.

Figure 8:
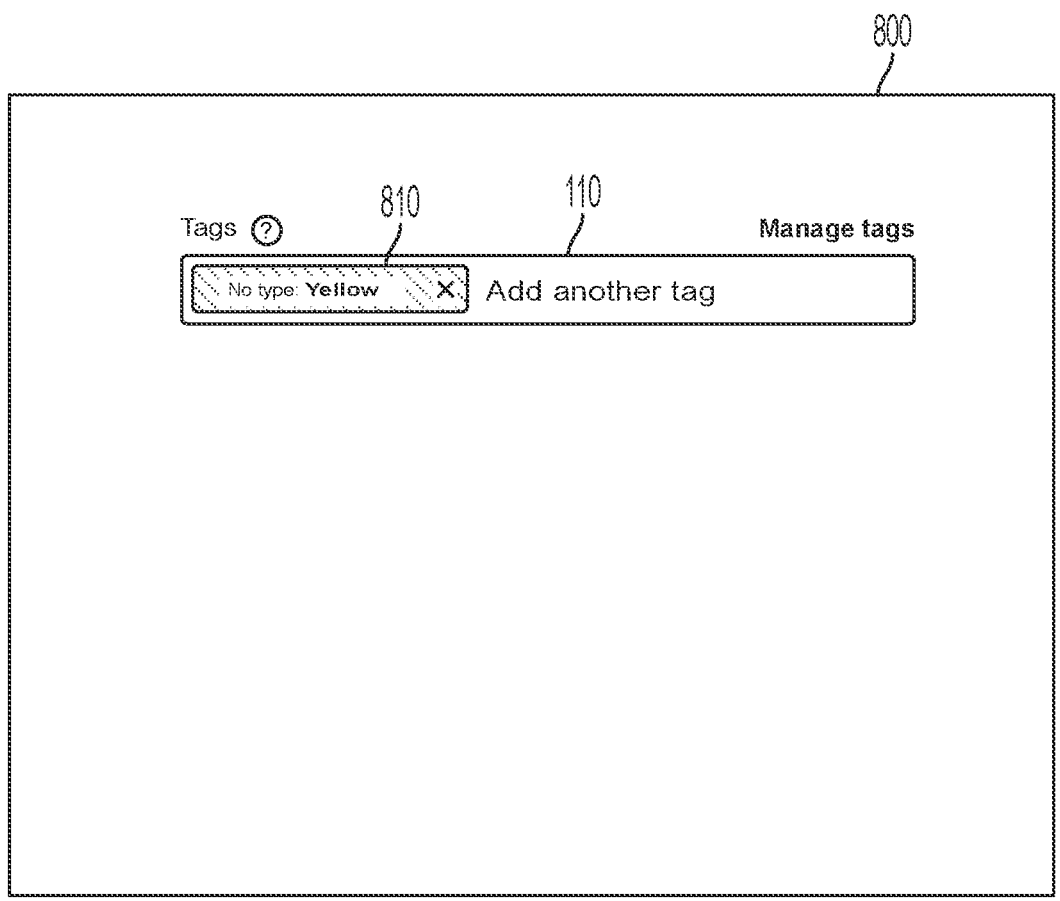
FIG. 8 depicts another example screen of a graphical user interface for tag management.

FIG. 8 illustrates another example screen 800 of the user interface for tag management. In an example, screen 800 is displayed after a user types "yellow" into text input field 110 of screen 100 of FIG. 1 and presses enter, or otherwise indicates that a new tag "yellow" is to be created without assigning a type.

Screen 800 includes representation 810 of the tag "yellow" with no type (e.g., a flat tag) within text input field 110, indicating that the tag "yellow" has been selected by the user for assignment to a data item.

Figure 9:
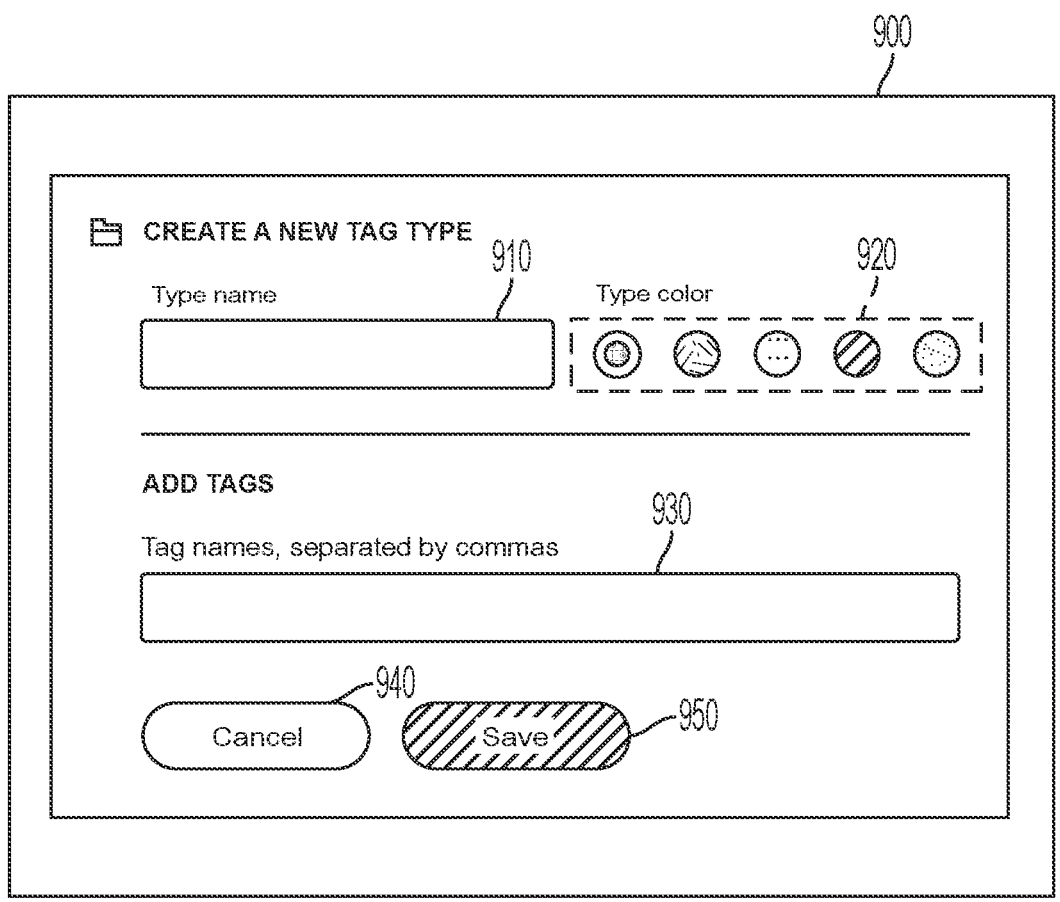
FIG. 9 depicts another example screen of a graphical user interface for tag management.

FIG. 9 illustrates another example screen 900 of the user interface for tag management. In an example, screen 900 is displayed after a user selects link 230 of FIG. 2 to create a new tag type.

Screen 900 includes text input field 910, in which a user may type a name for a new tag type. Screen 900 also includes color options 920, allowing the user to select a color to be associated with the new tag type.

Screen 900 also includes text input field 930 for adding tags to the new tag type. For example, the user may enter one or more tag names (e.g., separated by commas) to create one or more new tags of the new tag type.

Screen 900 also includes a cancel button 940 that closes the "create a new tag type" dialog (e.g., returning to screen 200 of FIG. 2) and a save button 950, which saves a newly created tag type (e.g., with newly created tags). Tags of the new type may then be selected by the user for assignment to a data item.

Figure 10:
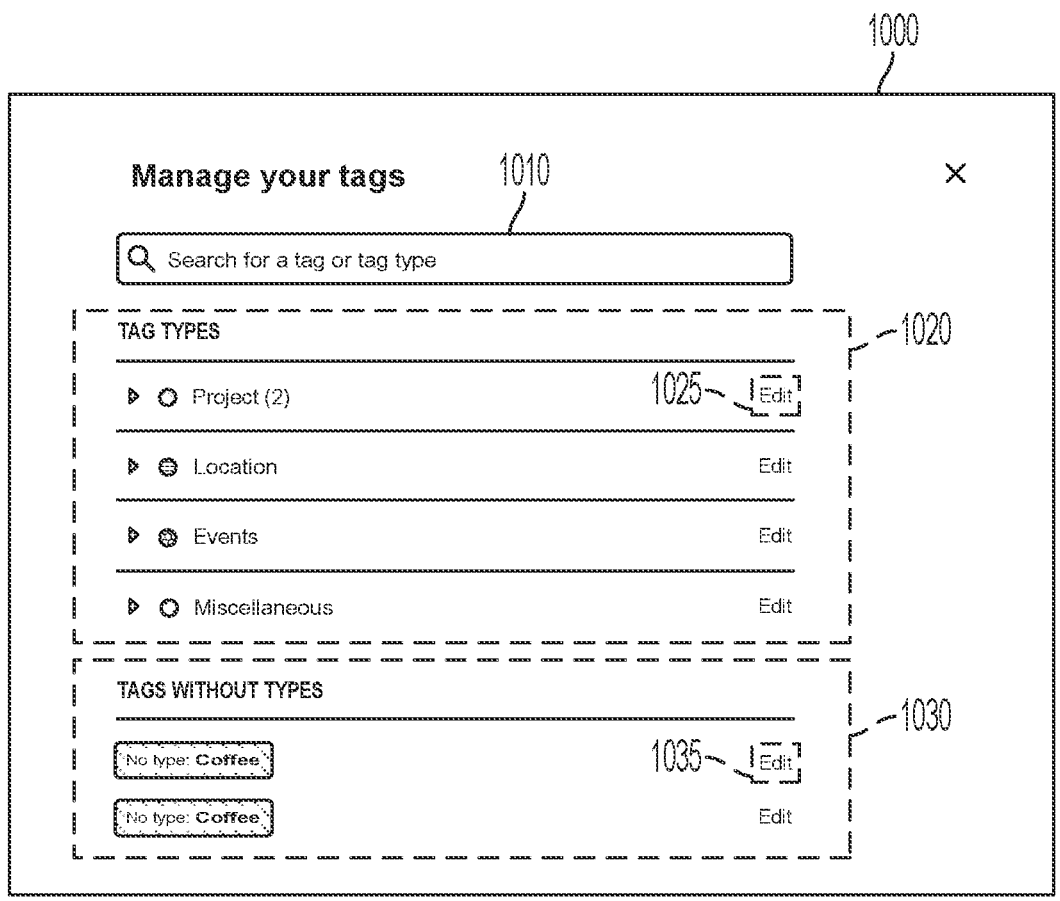
FIG. 10 depicts another example screen of a graphical user interface for tag management.

FIG. 10 illustrates another example screen 1000 of the user interface for tag management. In an example, screen 1000 is displayed after a user selects link 120 of FIG. 1 to manage tags.

Screen 1000 includes text input field 1010, in which a user may enter text to search for an existing tag or type. Screen 1000 also includes a list 1020 of tag types, indicating all existing types. In some embodiments, screen 1000 also includes screen 900 for adding a new tag type. Each tag type within list 1020 is associated with an edit link (e.g. edit link 1025) that allows the user to edit the type (e.g., changing the name or color of the type or adding or removing tags from the type). While not shown, each type within list 1020 may be expanded (e.g., upon selection) to view all tags within the type, and each tag may also be associated with an edit link that allows the user to edit the tag (e.g., changing the name or type of the tag).

Screen 1000 also includes a list 1030 of tags without types. Each tag within list 1030 is associated with an edit link (e.g. edit link 1035) that allows the user to edit the tag (e.g., changing the name or type of the tag).

It is noted that certain elements of screens 100-1000 of FIGS. 1-10 are included as examples, and variations are possible. For example different shapes, colors, orderings, and arrangements of various elements of the example user interfaces are possible without departing from the scope of the present disclosure.

Example Operations for Providing a Graphical User Interface for Tag Management

Figure 11:
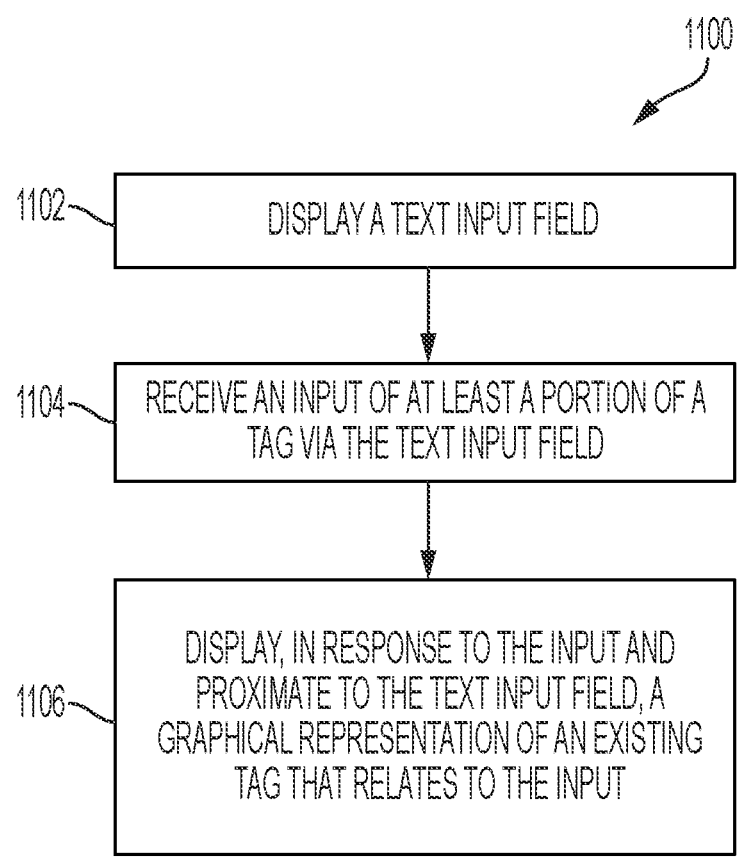
FIG. 11 depicts example operations for providing a graphical user interface for tag management.

FIG. 11 depicts example operations 1100 for providing a graphical user interface for tag management. For example, operations 1100 may be performed by system 1400 of FIG. 14, as described below.

At step 1102, a text input field is displayed. In an example, system 1400 of FIG. 14 causes a user interface including text input field 110 of FIG. 1 to be displayed via a display device.

At step 1104, an input of at least a portion of a tag is received via the text input field. In an example, system 1400 receives text input by the user defining a name of a tag or a portion of a name of a tag. For instance, the user may be searching for an existing tag or creating a new tag.

At step 1106, in response to the input and proximate to the text input field, a graphical representation of an existing tag that relates to the input is displayed.

In some embodiments, the graphical representation comprises: a type of the existing tag; the existing tag; and a colored section on a right side or a left side of the graphical representation having a color that is associated with the type of the existing tag in the computing application. In an example, the text entered at step 1104 matches an existing tag, and so the graphical representation of the existing tag is displayed so that the user may select the graphical representation to add the existing tag to a data item. In an example, the graphical representation is representation 320 of FIG. 3.

In some embodiments, the graphical representation has a rectangular shape with rounded corners.

In certain embodiments, the colored section fills a portion of the rectangular shape beginning at an edge of the rectangular shape.

In some embodiments, operations 1100 further comprise receiving a selection of the graphical representation and displaying an instance of the graphical representation inside of the text input field.

In certain embodiments, the instance of the graphical representation comprises a graphical element that allows the instance of the graphical representation to be removed from the text input field.

In some embodiments, the instance of the graphical representation is removed from the text input field in response to a selection of the graphical element.

In certain embodiments, the text input field allows additional input to be entered adjacent to the instance of the graphical representation.

In some embodiments, the existing tag comprises the portion of the tag. For example, as shown in FIG. 3, representation 320 indicates that the tag "project: landscaping" matches the portion of a tag entered into text input field 110 ("lan"), as "project: landscaping" includes the text "lan".

Figure 12:
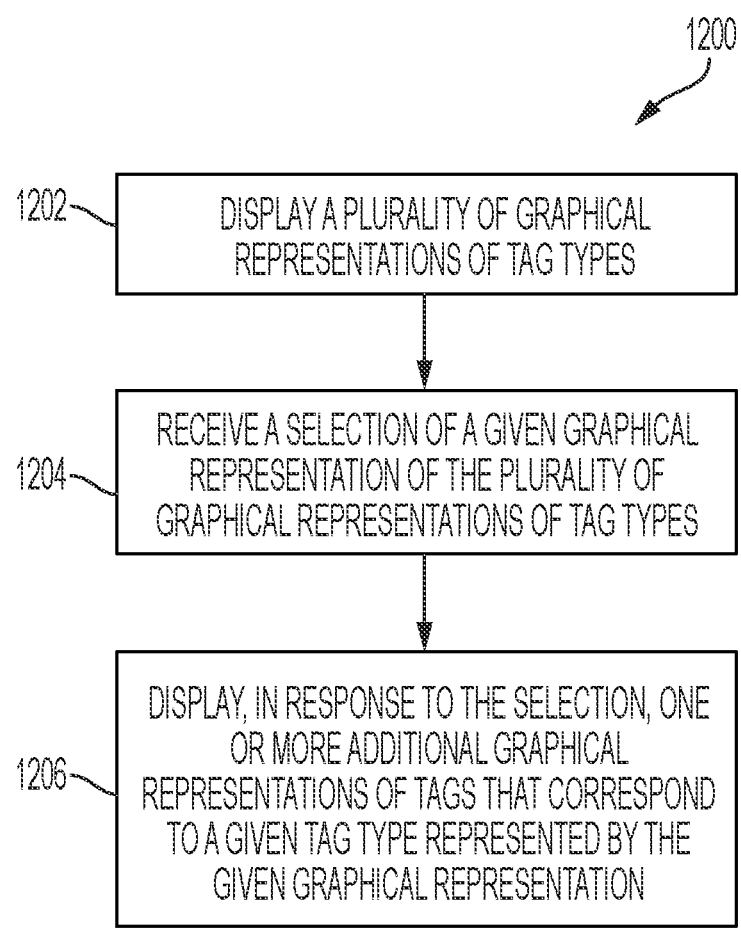
FIG. 12 depicts additional example operations for providing a graphical user interface for tag management.

FIG. 12 depicts additional example operations 1200 for providing a graphical user interface for tag management. For example, operations 1200 may be performed by system 1400 of FIG. 14, as described below.

At step 1202, a plurality of graphical representations of tag types are displayed.

In some embodiments, each respective graphical representation of the plurality of graphical representations of tag types comprises: text of a respective tag type; and a colored portion having a respective color that is associated with the respective tag type in the computing application. In an example, the graphical representations include representation 220 of FIG. 2.

At step 1204, a selection of a given graphical representation of the plurality of graphical representations of tag types is received. In an example, a user selects representation 220 of FIG. 2 in order to view tags within the type "project".

At step 1206, in response to the selection, one or more additional graphical representations of tags that correspond to a given tag type represented by the given graphical representation are displayed.

In some embodiments, each additional graphical representation of the one or more additional graphical representations of tags comprises: the given tag type; a given tag; and a colored section on a right side or a left side of the additional graphical representation having a given color that is associated with the given tag type in the computing application. In an example, the one or more additional graphical representations include representation 520 of FIG. 5.

In some embodiments, the colored portion is round.

In certain embodiments, the plurality of graphical representations of tag types is displayed below a text input field.

In some embodiments, operations 1200 further comprise displaying a graphical representation of a tag with no type, wherein the graphical representation of the tag with no type indicates that the tag has no type.

In certain embodiments, at least one graphical representation of the plurality of graphical representations of tag types further comprises an indication of a number of tags that correspond to the type.

In some embodiments, operations 1200 further comprise receiving an additional selection of an additional graphical representation of the one or more additional graphical representations of tags; and displaying an instance of the additional graphical representation inside of a text input field.

Figure 13:
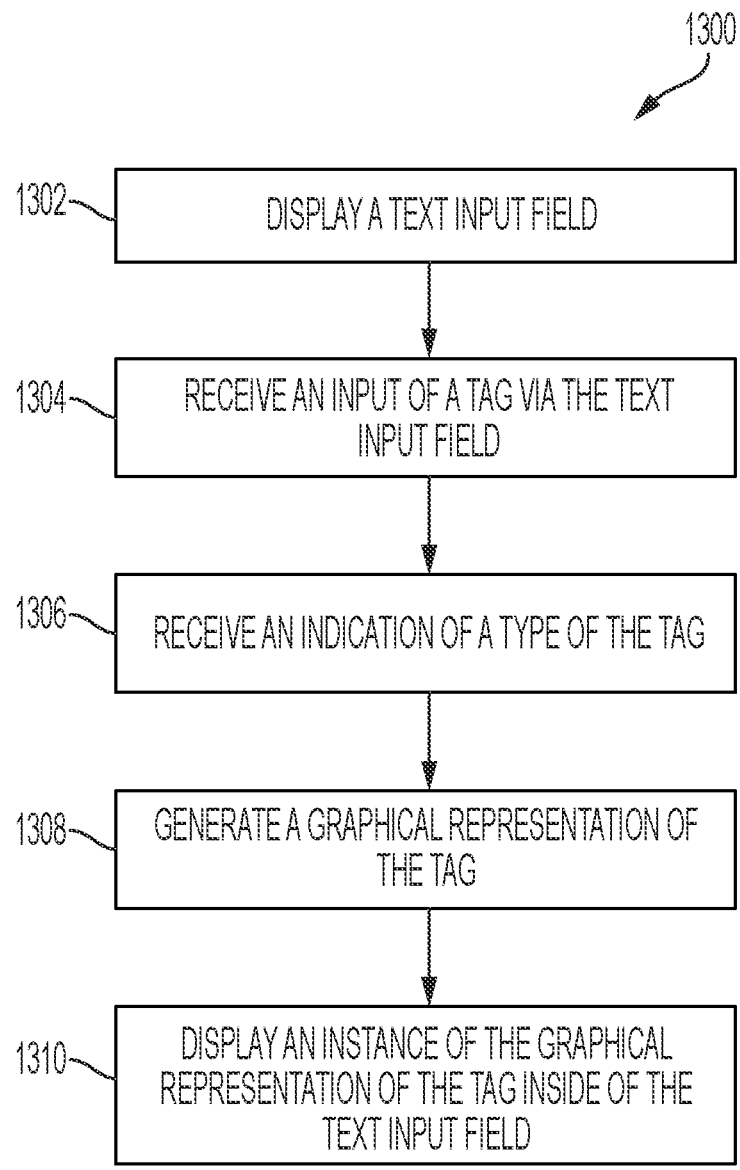
FIG. 13 depicts additional example operations for providing a graphical user interface for tag management.

FIG. 13 depicts additional example operations 1300 for providing a graphical user interface for tag management. For example, operations 1300 may be performed by system 1400 of FIG. 14, as described below.

At step 1302, a text input field is displayed. In an example, system 1400 of FIG. 14 causes a user interface including text input field 110 of FIG. 1 to be displayed via a display device.

At step 1304, an input of a tag is received via the text input field. In an example, a user enters the name of a new tag to be created.

At step 1306, an indication of a type of the tag is received. For example, the user may select an existing type or create a new type for the new tag.

At step 1308, a graphical representation of the tag is generated.

In some embodiments, the graphical representation of the tag comprises: the type of the tag; the tag; and a colored section on a right side or a left side of the graphical representation of the tag having a color that is associated with the type of the tag in the computing application. In an example, the graphical representation of the tag is representation 620 of FIG. 6 or representation 710 of FIG. 7.

At step 1310, an instance of the graphical representation of the tag is displayed inside of the text input field.

In some embodiments, receiving the indication of the type of the tag comprises displaying a plurality of graphical representations of tag types, wherein each respective graphical representation of the plurality of graphical representations of tag types comprises: text of a respective tag type; and a colored portion having a respective color that is associated with the respective tag type in the computing application. In some embodiments, receiving the indication of the type of the tag further comprises receiving a selection of a given graphical representation of the plurality of graphical representations of tag types, wherein the given graphical representation represents the type of the tag.

In certain embodiments, receiving the indication of the type of the tag comprises: receiving input specifying that a new type is being created; and receiving text input specifying a name of the type of the tag.

In some embodiments, a plurality of color options for the type of the tag are displayed.

In certain embodiments, each respective color option of the plurality of color options is displayed in a respective circular region.

Some embodiments include receiving a selection of the color from the plurality of color options for the type of the tag.

Figure 14:
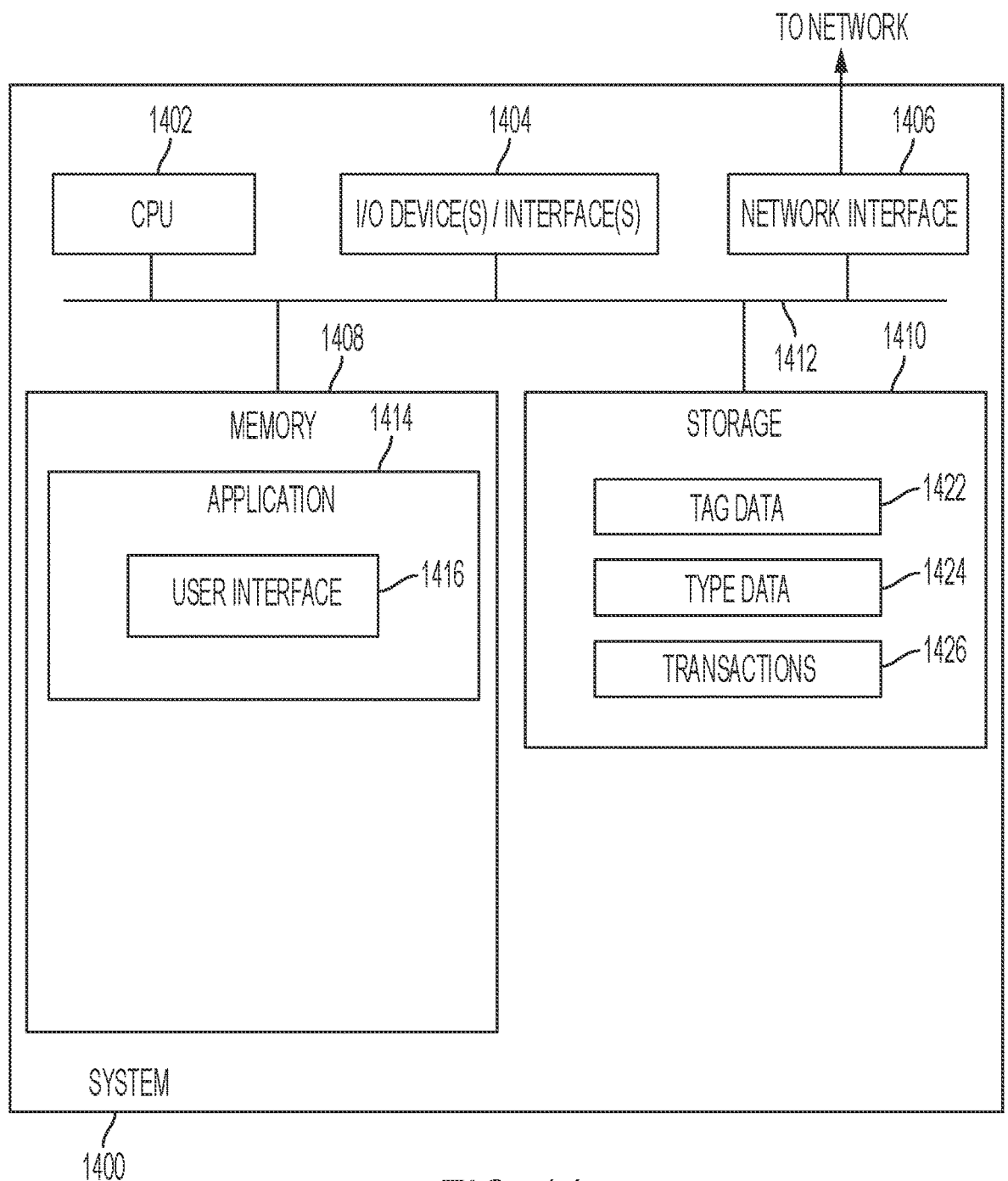
FIG. 14 depicts an example processing system for providing a user interface for tag management.

Example Computing System for Providing a
Graphical User Interface for Tag Management FIG. 14 illustrates an example system 1400 with which embodiments of the present disclosure may be implemented. For example, system 1400 may be used to provide screens 100-1000 of FIGS. 1-10, and may perform operations 1100, 1200, and 1300 of FIGS. 11, 12, and 13.

System 1400 includes a central processing unit (CPU) 1402, one or more I/O device interfaces 1404 that may allow for the connection of various I/O devices 1414 (e.g., keyboards, displays, mouse devices, pen input, etc.) to the system 1400, network interface 1406, a memory 1408, storage 1410, and an interconnect 1412. It is contemplated that one or more components of system 1400 may be located remotely and accessed via a network. It is further contemplated that one or more components of system 1400 may comprise physical components or virtualized components.

CPU 1402 may retrieve and execute programming instructions stored in the memory 1408. Similarly, the CPU 1402 may retrieve and store application data residing in the memory 1408. The interconnect 1412 transmits programming instructions and application data, among the CPU 1402, I/O device interface 1404, network interface 1406, memory 1408, and storage 1410. CPU 1402 is included to be representative of a single CPU, multiple CPUs, a single CPU having multiple processing cores, and other arrangements.

Additionally, the memory 1408 is included to be representative of a random access memory. As shown, memory 1408 includes application 1414, with which a user interacts via user interface 1416. In one example, application 1414 is a financial services application that allows users to assign tags of different types to transactions, and to manage tags and types. User interface 1416 generally represents a graphical user interface provided by application 1414. For example, user interface 1416 may include screens 100-1000 of FIGS. 1-10. In some embodiments, a user may interact with user interface 1416 over a network, such as from a separate client device.

Storage 1410 may be a disk drive, solid state drive, or a collection of storage devices distributed across multiple storage systems. Although shown as a single unit, the storage 1410 may be a combination of fixed and/or removable storage devices, such as fixed disc drives, removable memory cards or optical storage, network attached storage (NAS), or a storage area-network (SAN).

Storage 1410 comprises tag data 1422 and type data 1424, which generally represent information related to tags and types, such as names and types of tags, names and colors of types, assignments of tags to data items (e.g., transactions 1426), and the like. Storage 1410 further comprises transactions 1426, which generally represent transaction records with which tags are associated within application 1414. While tag data 1422, type data 1424, and transactions 1424 are depicted in local storage of system 1400, it is noted that tag data 1422, type data 1424, and/or transactions 1424 may also be located remotely (e.g., at a location accessible over a network, such as the Internet).

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for providing a graphical user interface for a computing application, comprising:
   displaying a text input field;
   receiving an input of at least a portion of a tag via the text input field;
   displaying, based on the input and proximate to the text input field, a user interface control that, when selected, causes a new tag corresponding to the input to be created within an existing tag type, wherein the user interface control comprises a given color that is associated with the existing tag type;
   receiving a selection of the user interface control; and
   displaying, based on the selection, a graphical representation of the new tag inside of the text input field, wherein the graphical representation comprises a colored portion having the given color, wherein the given color is associated with a plurality of tags that are grouped into the existing tag type.

2. The method of claim 1, wherein the user interface control is displayed below the text input field.

3. The method of claim 1, wherein the colored portion fills a portion of the graphical representation beginning at an edge of the graphical representation.

4. The method of claim 1, wherein text of the graphical representation comprises the existing tag type and the new tag.

5. The method of claim 4, wherein the existing tag type and the new tag are separated in the text of the graphical representation by a delimiter.

6. The method of claim 1, further comprising removing the graphical representation from the text input field in response to a selection of a graphical element associated with the graphical representation.

7. The method of claim 1, wherein the text input field allows additional input to be entered adjacent to the graphical representation.

8. The method of claim 1, wherein text of the new tag includes the portion of the tag received in the input.

9. A system, comprising:
   one or more processors; and
   a memory comprising instructions that, when executed by the one or more processors, cause the system to:
      display a text input field;
      receive an input of at least a portion of a tag via the text input field;

display, based on the input and proximate to the text input field, a user interface control that, when selected, causes a new tag corresponding to the input to be created within an existing tag type, wherein the user interface control comprises a given color that is associated with the existing tag type;

receive a selection of the user interface control; and display, based on the selection, a graphical representation of the new tag inside of the text input field, wherein the graphical representation comprises a colored portion having the given color, wherein the given color is associated with a plurality of tags that are grouped into the existing tag type.

10. The system of claim 9, wherein the user interface control is displayed below the text input field.

11. The system of claim 9, wherein the colored portion fills a portion of the graphical representation beginning at an edge of the graphical representation.

12. The system of claim 9, wherein text of the graphical representation comprises the existing tag type and the new tag.

13. The system of claim 12, wherein the existing tag type and the new tag are separated in the text of the graphical representation by a delimiter.

14. The system of claim 9, wherein the instructions, when executed by the one or more processors, further cause the system to remove the graphical representation from the text input field in response to a selection of a graphical element associated with the graphical representation.

15. The system of claim 9, wherein the text input field allows additional input to be entered adjacent to the graphical representation.

16. The system of claim 9, wherein text of the new tag includes the portion of the tag received in the input.

17. A method for providing a graphical user interface for a computing application, comprising:

displaying a text input field;

receiving an input of at least a portion of a tag via the text input field;

displaying, based on the input and proximate to the text input field, a plurality of user interface controls, wherein each given user interface control of the plurality of user interface controls:

when selected, causes a new tag corresponding to the input to be created within a respective existing tag type; and comprises a given color that is associated with the respective existing tag type;

receiving a selection of a user interface control of the plurality of user interface controls; and displaying, based on the selection, a graphical representation of the new tag inside of the text input field, wherein the graphical representation comprises a colored portion having a color corresponding to an existing tag type associated with the user interface control, wherein the color is associated with a plurality of tags that are grouped into the existing tag type.

18. The method of claim 17, wherein the plurality of user interface controls are displayed below the text input field.

19. The method of claim 17, wherein the colored portion fills a portion of the graphical representation beginning at an edge of the graphical representation.

20. The method of claim 17, wherein text of the graphical representation comprises the existing tag type and the new tag.

* * * * *